United States Patent
Hartung et al.

(10) Patent No.: US 11,506,525 B2
(45) Date of Patent: Nov. 22, 2022

(54) METHOD FOR VERIFYING SENSORS IN A SENSOR NETWORK, AND SENSOR NETWORK

(71) Applicant: Siemens Aktiengesellschaft, Munich (DE)

(72) Inventors: Jörn Hartung, Berlin (DE); Jens-Christian Holst, Berlin (DE); Florian Ansgar Jaeger, Berlin (DE); Nicolas Moegelin, Berlin (DE); Katrin Müller, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/270,641

(22) PCT Filed: Aug. 19, 2019

(86) PCT No.: PCT/EP2019/072085
§ 371 (c)(1),
(2) Date: Feb. 23, 2021

(87) PCT Pub. No.: WO2020/043519
PCT Pub. Date: Mar. 5, 2020

(65) Prior Publication Data
US 2021/0341319 A1 Nov. 4, 2021

(30) Foreign Application Priority Data
Aug. 29, 2018 (EP) .................................. 18191495

(51) Int. Cl.
*G01D 18/00* (2006.01)
*G01D 21/00* (2006.01)
*G01D 3/08* (2006.01)

(52) U.S. Cl.
CPC ............... *G01D 18/00* (2013.01); *G01D 3/08* (2013.01); *G01D 21/00* (2013.01)

(58) Field of Classification Search
CPC .......... G01D 18/00; G01D 21/00; G01D 3/08
See application file for complete search history.

(56) References Cited

U.S. PATENT DOCUMENTS

| 8,832,461 B2 * | 9/2014 | Saroiu | ................... H04L 9/3247 713/189 |
|---|---|---|---|
| 2007/0180918 A1 | 8/2007 | Bahr | .............................. 73/760 |

(Continued)

FOREIGN PATENT DOCUMENTS

| CN | 106463049 A | 2/2017 | ............... G08G 1/01 |
|---|---|---|---|
| CN | 109959593 A | 7/2019 | ............. G01N 15/06 |

(Continued)

OTHER PUBLICATIONS

David ("Enabling Large-Scale Urban Air Quality Monitoring with Mobile Sensor Nodes", ETH-Zürich, 2015, https://doi.org/10.3929/ethz-a-010361120) (Year: 2015).*

(Continued)

*Primary Examiner* — Daniel R Miller
*Assistant Examiner* — Christian T Bryant
(74) *Attorney, Agent, or Firm* — Slayden Grubert Beard PLLC (57) ABSTRACT

Various embodiments include a method for verifying sensors for a sensor network including a reference sensor comprising: identifying a first sensor; locating the identified sensor; comparing a measured value recorded by the identified sensor to a measured value recorded at the same time and within a defined spatial environment using the reference sensor; determining a deviation of the measured value of the identified sensor from the measured value of the reference (Continued)

sensor; and assigning the sensor to precisely one of at least two categories depending on an amount of the deviation.

10 Claims, 3 Drawing Sheets

(56) References Cited

U.S. PATENT DOCUMENTS

| | | | | |
|---|---|---|---|---|
| 2009/0256713 | A1 | 10/2009 | Kalisch | .......................... 340/627 |
| 2012/0023564 | A1* | 1/2012 | Tsiatsis | ................... H04L 63/08 |
| | | | | 726/7 |
| 2014/0281051 | A1* | 9/2014 | Lee | ........................ G01D 21/00 |
| | | | | 710/15 |
| 2016/0084684 | A1 | 3/2016 | Granig | ................... G01D 18/00 |
| 2017/0023945 | A1 | 1/2017 | Cavalcanti et al. | ............ 701/23 |
| 2017/0089723 | A1 | 3/2017 | Heide | ...................... G01D 3/08 |
| 2017/0208493 | A1* | 7/2017 | Masson | .................... H04W 4/70 |
| 2017/0284839 | A1* | 10/2017 | Ojala | ....................... H04L 67/12 |
| 2019/0195769 | A1 | 6/2019 | Mcbrady et al. | |

FOREIGN PATENT DOCUMENTS

| | | | |
|---|---|---|---|
| DE | 10 2004 011 693 | 9/2005 | ............. G01D 21/00 |
| DE | 10 2005 023 485 | 11/2006 | ............. G08C 17/02 |
| DE | 10 2014 211 168 | 12/2015 | ............. G01S 19/45 |
| DE | 10 2015 218 294 | 3/2016 | ............. G01D 18/00 |
| WO | WO-2017205899 A1 * | 12/2017 | ............. G06Q 90/00 |

OTHER PUBLICATIONS

Search Report for International Application No. PCT/EP2019/072085, 12 pages, dated Nov. 18, 2019.

Chinese Office Action, Application No. 201980056151.X, 18 pages, dated Apr. 26, 2022.

* cited by examiner

METHOD FOR VERIFYING SENSORS IN A SENSOR NETWORK, AND SENSOR NETWORK

CROSS-REFERENCE TO RELATED APPLICATIONS

This application is a U.S. National Stage Application of International Application No. PCT/EP2019/072085 filed Aug. 19, 2019, which designates the United States of America, and claims priority to EP Application No. 18191495.3 filed Aug. 29, 2018, the contents of which are hereby incorporated by reference in their entirety.

TECHNICAL FIELD

The present disclosure relates to sensor networks. Various embodiments of the teachings herein include methods for verifying sensors for a sensor network, wherein at least one reference sensor is located in the sensor network and/or sensor networks prepared to enable a method for verifying these sensors.

BACKGROUND

Sensor networks are used, for example, to capture data relating to the air quality, in particular in conurbations such as cities. There is, for example, an open data platform on the Internet www.luftdaten.info which can be used to map data. These data may be provided by self-constructed or officially installed sensors. This is an initiative by the company Büro für Gestalten/DE-natürlich Werben, domiciled in Stuttgart. The self-constructed sensors consist of inexpensively offered sensor construction kits which can be purchased from www.luftdaten.info. The initiative is therefore a solution which is based on as many users as possible purchasing the sensor construction kits in order to obtain a network of sensors which is as comprehensive as possible. The quality of the sensor network therefore depends on the purchasing behavior of the users. However, there is also a problem here since rather socially weaker residents of a conurbation, who can get involved to a lesser extent with the required investments, live, in particular, in problematic air pollution zones, for example.

A further problem is that the measurement accuracy of said sensor network is assessed to be fluctuating by the provider. Therefore, there is no claim to a particularly high degree of accuracy, as communicated by the provider itself. The evaluation of the data by means of databases and algorithms therefore does not provide any particularly accurate results.

Furthermore, there are commercial providers, for example the company Hawa Dawa. A network of specifically developed pollutant sensors for weather and traffic data is offered by said company. An appropriate investment can therefore produce comprehensive information relating to air quality in real time, but this solution depends, for example, on the municipal administration of a conurbation making greater investments in this network. The budget required for this is often not available.

In addition, the German Federal Environmental Agency, for example, also operates a number of calibrated measurement stations. The German Federal Environmental Agency cooperates with the state governments for this purpose. However, the density of these measurement stations is very low, with the result that measured values are mathematically interpolated between the measurement stations or are determined by means of model calculations. Although this approach is suitable for running nationwide evaluations, it is not possible to use it to locally exactly measure or predict the exact development of the air quality in conurbations.

SUMMARY

The teachings of the present disclosure describe sensor networks for determining the air quality, which are inexpensive to buy and optimally use the resources, on the one hand, and provide data of a sufficient quality, on the other hand. In addition, the teachings of the present disclosure include methods for verifying sensors in such a sensor network, which methods make it possible to set up and/or operate such a network.

These objects, among others, may be achieved by an example method wherein:
the sensor is identified,
a check is carried out in order to determine whether the identified sensor (mobile or stationary) is registered,
the identified sensor is registered only if it has not yet been registered,
the identified sensor is located,
a measured value recorded using the identified sensor is compared with a measured value which was recorded at the same time and within a defined spatial environment using the reference sensor,
a deviation of the measured value of the identified sensor from the measured value of the reference sensor is determined,
the sensor is assigned to precisely one of at least two categories depending on the deviation.

BRIEF DESCRIPTION OF THE DRAWINGS

The exemplary embodiments explained below are example embodiments of the teachings herein. The described components of the embodiments are each individual features of the disclosure which should be considered independently of one another, each also develop the teachings independently of one another and can therefore also be considered to be part of the teachings individually or in a combination other than that shown. Furthermore, the described embodiments can also be supplemented with further features of the features which have already been described. In the drawings.

DETAILED DESCRIPTION

The methods described herein are therefore suitable for providing a verification system which can be used to verify all existing sensors from different providers or in different sensor networks. A standard which is designed for the methods and, as explained in yet more detail below, makes it possible to verify different sensors is used for this purpose. The algorithm continuously checks the exact position of the sensor to be verified. In this case, stationary sensors and also mobile sensors (for example in vehicles) can be included in the verification.

The mobile sensors can be located at different locations of the sensor network and can also leave this sensor network or enter this sensor network. In addition to the position of the sensor, each verification pass (that is to say the operation described above) is provided with a time stamp. This is necessary in order to confirm a simultaneous measurement, with the result that the measured values can also be compared, as stated above. Verified sensors then belong to the sensor network and can provide data which are determined in a locally tied manner and thereby enable a profile of the air quality or else of other criteria to be determined using a sensor network (for example, a sensor network for determining water quality in a body of water or a water system would also be conceivable).

The decision as to whether a sensor can be included in the sensor network is therefore supported by the fact that sensors which have already been verified are used to assess the quality of a new sensor by means of simultaneous measurements. The measured data are classified for this purpose. As explained in yet more detail below, different classes of sensors can be categorized. In any case, there is a "suitable" sensor class (that is to say the accuracy is sufficient for the purposes of the sensor network) and an "unsatisfactory" category (that is to say this sensor cannot be included in the sensor network but can either be checked again at a later time or is definitively excluded from the sensor network).

One embodiment provides for at least two of the following sensor categories to be provided for the purpose of categorizing the sensors:

category 1 means that the accuracy of the identified sensor is sufficient to verify other sensors, category 2 means that the accuracy of the identified sensor is sufficient to use the measured values for data processing, category 3 means that the sensor has an excessively low degree of accuracy, in which case this can be checked again at a later time, category 4 means that the sensor has an excessively low degree of accuracy to be checked again in the method.

The teachings herein describe a universal categorization principle, in which case this principle can be supplemented with further categories. Category 1 means that the sensor is so accurate that it provides a sufficient degree of accuracy for verifying other sensors. This accuracy must be higher than the accuracy needed to provide measured values for assessing the air quality. Otherwise, the accuracy of the sensors to be verified cannot be determined with sufficient reliability.

Category 2 means that the verified sensor can be used in future at least to determine measured values for the sensor network. However, the accuracy does not suffice to verify further sensors, which have not yet been included in the sensor network, in a sufficiently reliable manner.

Category 3 means that, although a sensor falls out of the permissible tolerance range, it cannot be precluded, on the basis of the measurement errors or the measurement situation, that the quality of the sensor could be sufficient. Therefore, this sensor can be examined again at a later time.

Category 4 means that the deviations are so great that it is possible to preclude that the accuracy suffices to record the desired data. This sensor can then be definitively rejected as it were. Since all sensors which have been identified once in the sensor network or for the sensor network are recognized, a sensor in category 4 is not verified again. This has the advantage that the in the verification method can be carried out more efficiently in this way since unnecessary dual measurements are avoided.

The data in category 1 and category 2 can be used for evaluations.

If a sensor network for determining the air quality (or water quality) is involved, these data can be provided, for example, for an information service. This information service can forward health information, for example the fact that people with breathing problems avoid particular areas of the conurbation in the case of excessively high ozone pollution or that particular bathing lakes for swimming are closed. The information can also be used for traffic management. For example, pressure on streets with excessively high nitrogen pollution can be relieved by means of traffic management. This enables air quality management which is supported by the sensor network.

In some embodiments, sensors which have been assigned category 3 to be subjected to a new check at intervals of time by comparing measured values recorded using these sensors with a measured value which was recorded at the same time and within a defined spatial environment using the reference sensor (for example a verified sensor in category 1 or a calibrated sensor).

Unlike the sensors in category 4 which were definitively excluded from the sensor network, a check can be carried out for category 3 in order to determine whether these sensors generally have a sufficient degree of accuracy and the measurement which resulted in the categorization in category 3 was only an outlier. If, however, repeated measurements, for example 3, 5 or 10 measurements, constantly resulted in an allocation of category 3, such a sensor can also be definitively excluded from the sensor network. Even if a measurement results only once in the assignment of category 4, the sensor can be definitively excluded from the sensor network.

It is also possible for sensors in category 1 and/or 2 to be subjected to a check again at regular intervals. This makes it possible to determine, for example, ageing-related quality deteriorations of the sensors, which is why it may be necessary to also assign verified sensors to another category at a later time and, in the worst case scenario, to exclude them from the sensor network.

In some embodiments, each measured value of the identified sensor and/or of the reference sensor is provided with a measurement time. This means that the measurement time is not only used to verify the sensors but also the sensor data, which are subsequently subjected to an evaluation, for example in order to determine the air quality, are clearly provided with the measurement time as a time stamp as it were. This facilitates subsequent evaluations of the measured values because they can also be archived with the associated measurement time. An alternative is to store all sensor data for the network in a database, for example, which concomitantly stores the storage time.

In some embodiments, calibrated sensors may be used as reference sensors. If calibrated sensors are available in a sensor network, they are particularly important for the accuracy of the sensor network. They also therefore do not need to be subjected to the verification procedure since calibrated sensors have a degree of accuracy sufficient for the measurement purpose and this is also regularly confirmed by the Office of Weights and Measures. However, it goes without saying that it is also possible to verify these sensors if the verification method does not make any distinction here, since calibrated sensors of the verification method will always run through with category 1. However, if calibrated sensors can already be identified as such as part of the identification, the verification process can also be shortened by immediately assigning category 1 to these sensors.

Calibrated sensors are also particularly suitable for subjecting sensors which have already been verified to a check at regular intervals in order to determine whether they are still operating accurately enough for their task. These regular investigations for the verified sensors then replaced the calibration process which must be regularly run through by the calibrated sensors at the Office.

In some embodiments, mobile sensors may be used as reference sensors, wherein they are used to verify sensors which enter the spatial environment of the mobile sensors during a movement of the latter. The principle naturally also functions the other way round. This means that the reference sensors are stationary and a sensor to be verified is mobile, for example installed on an automobile. This sensor can be verified by the stationary reference sensor as it moves past.

In some embodiments, the mobile sensors in the network of sensors make it possible for sensor networks in which the sensor density is not yet so high that all sensors are in the region of a verified sensor to also be able to be verified. This is because, if mobile sensors in category 1 are verified, they can contribute, by virtue of the movement inside the sensor network, to sensors being able to be verified which are so far away from other sensors which have already been verified that verification would otherwise not be possible. The background of the problem in the sensor network is specifically the fact that verification is possible only if the sensors are each within a spatially defined environment. This means that the measured values can be compared only when the same measurement conditions or at least very similar measurement conditions are present. Otherwise, deviations of the measured values could be due to actually different measurement conditions, with the result that a measurement error could not be identified or an error is identified even though it was due to the different measurement conditions.

In some embodiments, a spatial environment can be defined such that the environment surrounds the sensor in a circular manner with a particular radius. In this case, new sensors could be verified only if the distance of the (identified) sensor to be verified and of the reference sensor is less than the radius of the spatial environment.

In some embodiments, cells of variable size (area) and contour (shape) are defined as spatial environments (in a similar manner to the cells of a mobile radio network). In this case, it is possible to take into account special features which are associated with the conurbation. For example, it may be necessary to set up a more closely meshed network of cells in inner cities which are densely built-up. Houses possibly separate parks from street areas, with the result that different conditions prevail in the park and on the street even though these areas are very close together. In areas which are less densely populated, for example in a municipal forest, constant conditions possibly prevail, with the result that the cell could be very much larger.

In some embodiments, the reference sensor to be located in a means of transport. Locating the sensor in a means of transport advantageously enables the measurement in conurbations precisely where air pollution may be particularly critical (for example nitrogen oxide pollution on congested streets). These areas can therefore be monitored particularly well using the mobile sensors. In addition, the means of transport are constantly on the move (for example public means of transport such as buses), with the result that it is also easily possible to always verify new sensors in the sensor network.

In some embodiments, the route of the reference sensor may be located in the means of transport to be tracked. If the route of the means of transport with the located reference sensor is tracked, this local change can be correlated with the temporal change in the recording of the measured values. In this case, it is also possible, for example, to determine the development of the air quality in the morning rush-hour traffic, for example how the breathing strain for a cyclist increases when the latter moves from a green suburb into the inner city plagued with congestion. It is therefore possible to also determine additional data which provide very clear measurement results, in particular.

In some embodiments, a data processing system is designed to carry out the method as described herein. A network of sensors, for example for determining the air quality, benefits from the method which has already been explained in more detail above. A sensor network operating with this method is therefore also suitable for achieving the object stated above. The advantages associated with this method have already been explained above.

A sensor network which is operated using the method stated above must therefore be equipped with a computer which can execute the algorithms of the method stated above. In addition to a transmitting and receiving interface for the sensors, this computer also has a database which can store the sensor values. In addition, a program which controls the method in the manner described above runs in the computer. Such a program (computer program product) is explained in more detail below.

In some embodiments, a sensor network may be installed in a conurbation, in particular a city.

In some embodiments, the air quality may be able to be measured using the sensors.

As another example, some embodiments include a computer program product having program instructions for carrying out said method.

In some embodiments, there is a data storage medium which stores and/or provides a computer program product. In some embodiments, the provision apparatus is, for example, a network service, a computer system, a server system, in particular a distributed computer system, a cloud-based computer system and/or a virtual computer system which stores and/or provides the computer program product, e.g. in the form of a data stream.

This provision is effected, for example, as a download in the form of a program data block and/or an instruction data block, preferably as a file, in particular as a download file, or as a data stream, in particular as a download data stream, of the complete computer program product. However, this provision may also be effected, for example, as a partial download which consists of a plurality of parts and, in particular, is downloaded via a peer-to-peer network or is provided as a data stream. Such a computer program product is read into a system, for example using the provision apparatus in the form of the data storage medium, and executes the program instructions, with the result that the method according to the invention is executed on a computer.

Unless stated otherwise in the following description, the terms "create", "calculate", "compute", "determine", "generate", "configure", "modify" and the like preferably relate to actions and/or processes and/or processing steps which change and/or generate data and/or convert the data into other data, wherein the data are represented or may be present, in particular, as physical variables, for example as electrical pulses. In particular, the expression "computer" should be broadly interpreted in order to cover all electronic devices with data-processing properties. Computers may therefore be, for example, personal computers, servers, handheld computer systems, pocket PC devices, mobile radio devices and other communication devices which can process data in a computer-aided manner, processors and other electronic data processing devices which can preferably also be combined to form a network.

In this disclosure, "computer-aided" can be understood as meaning, for example, an implementation of the method in which one or more computers carry out at least one method step of the method.

In this disclosure, a "processor" can be understood as meaning, for example, a machine or an electronic circuit. A processor may be, in particular, a main processor (Central Processing Unit, CPU), a microprocessor or a microcontroller, for example an application-specific integrated circuit or a digital signal processor, possibly in combination with a storage unit for storing program instructions, etc. A processor may also be, for example, an IC (Integrated Circuit), in particular an FPGA (Field Programmable Gate Array) or an ASIC (Application-Specific Integrated circuit) or a DSP (Digital Signal Processor). A processor can also be understood as meaning a virtualized processor or a soft CPU. It may also be, for example, a programmable processor which is equipped with a configuration for carrying out said methods.

In this disclosure, a "storage unit" can be understood as meaning, for example, a computer-readable memory in the form of a main memory (Random Access Memory, RAM) or a hard disk.

Further details of the teachings herein are described below on the basis of the drawing. Identical or corresponding elements of the drawing are each provided with the same reference signs and are explained repeatedly only in so far as differences emerge between the individual figures.

Figure 1:
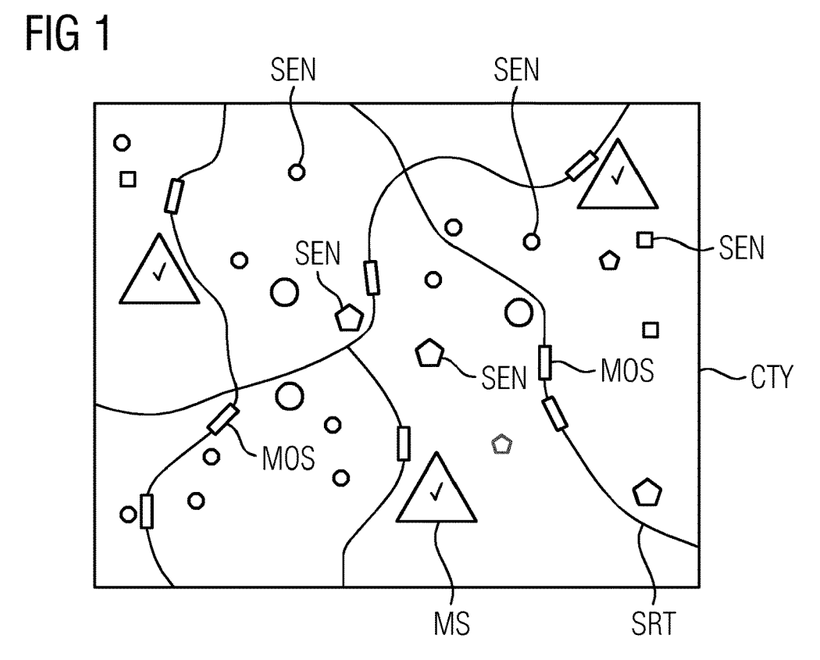
FIGS. 1 and 2 show exemplary embodiments of a sensor network, wherein they are illustrated as a map in an idealized manner, and different stages of a sequence of an exemplary embodiment of a method incorporating the teachings herein are illustrated in FIGS. 1 and 2.

FIG. 1 illustrates a conurbation in the form of a city CTY. In this conurbation, there are routes in the form of streets SRT which run through the conurbation as a network. Mobile sensors MOS, which may be accommodated, for example, in public transport vehicles or else in private automobiles, may be on the move on the streets. There are also calibrated sensors MS which are checked by a state calibration institution at regular intervals. It is therefore ensured that the calibrated sensors MS in any case meet the accuracy requirements of the measurements to be carried out.

There are also various sensors SEN which belong to different providers or other organizations, as already explained at the outset with respect to the prior art. These sensors are represented by geometrical figures, specifically circles, squares and pentagons. This is intended to express the fact that they belong to different groups. For example, all circles may represent sensors which are offered by an open source Internet platform. This has already been explained at the outset. They may be self-build sensors which are combined in a network. Further sensors may be, for example, commercial sensors which are operated, for example, by a car sharing company or a rental car company (squares) or a taxi company (pentagons). Said companies may be paid for operating the sensors, for example, in order to provide an incentive for recording measured values.

Initially, only the calibrated sensors MS are verified for use in the sensor network. This is indicated by the fact that the calibrated sensors MS are provided with a tick.

Figure 2:
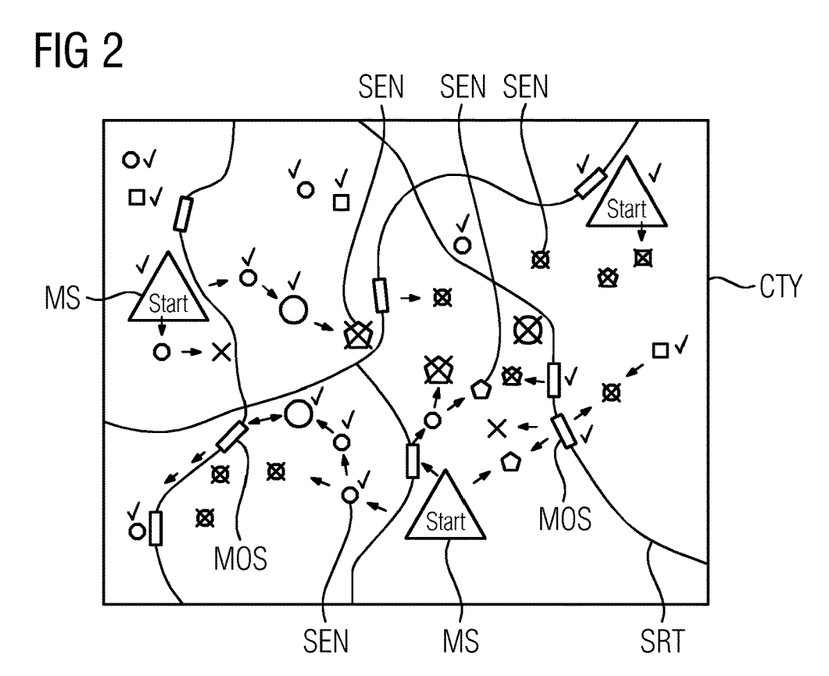

It can be gathered from FIG. 2 how an increasing number of sensors SEN is gradually checked by means of the methods described herein. As already mentioned, the calibrated sensors MS are the starting point, which is why they are also indicated with the word "start" in FIG. 2. As indicated by arrows in FIG. 2, it is possible, starting from the calibrated sensors MS, to verify respectively adjacent sensors SEN or else mobile sensors MOS if they are currently in the spatial catchment area of such a calibrated sensor MS. In this manner, both stationary sensors SEN in the vicinity of the calibrated sensors and mobile sensors MOS are verified if they are moving along a street SRT in the vicinity of a calibrated (or already verified) sensor. Respective verifications of sensors SEN and mobile sensors MOS are likewise indicated by a tick. The sequence of verifications can be understood on the basis of the arrows.

However, if the sensor to be verified does not achieve the required measurement accuracy, this sensor is excluded from the sensor network. This is represented by a cross in FIG. 2.

However, not all of the sensors SEN are in the catchment area of a calibrated sensor MS. In order to gradually develop the complete sensor network, use is therefore made of the mobile sensors MOS which have already been verified and are moved on the streets SRT and in this manner also pass sensors SEN which are not in the catchment area of a calibrated sensor MS. Further sensors in the sensor network can then be verified as the mobile sensors pass. In this case, the mobile sensors MOS are used as it were as a vehicle for distributing verified sensors SEN.

Figure 3:
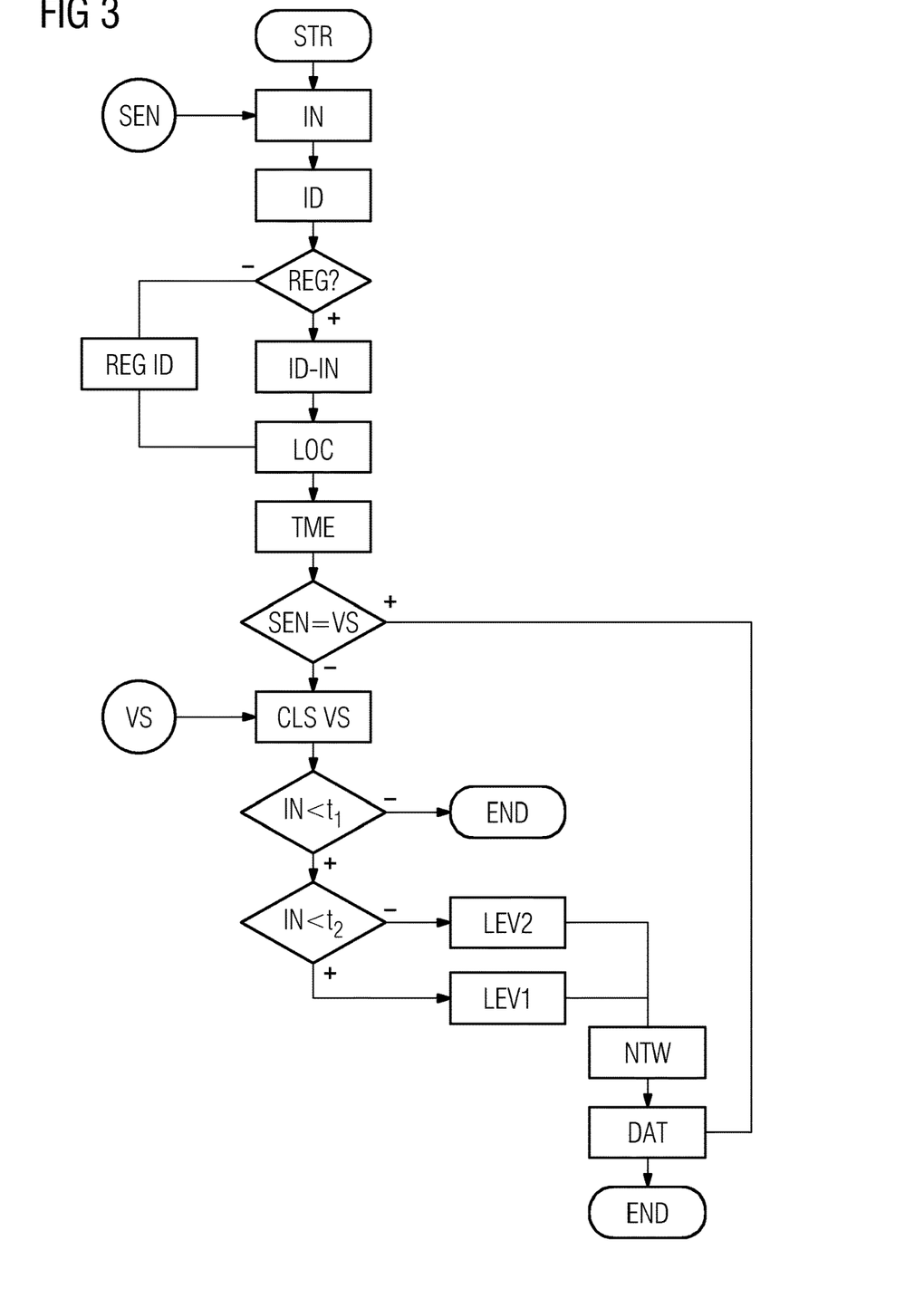
FIG. 3 shows an exemplary embodiment of a method incorporating teachings of the present disclosure in the form of a flowchart.

The sequence of a verification procedure can be gathered from FIG. 3. After a start STR, a sensor SEN which enters the range of a verified sensor VS first of all makes an input IN of a measured value. This input is transmitted, for example, to an antenna, for example via a wireless interface. An identification ID is then carried out in the sensor network, in which case this identification can result in the sensor being recognized as an already registered sensor within the scope of a query. In the step REG?, in the positive case, that is to say if the already registered sensor is recognized on the basis of its ID, the measured value of the input IN is correlated with the ID in the step ID-IN. If the query for registration REG? is negative, the sensor is registered for the first time in the step REG ID. In any case, the sensor SEN to be verified is then located in the step LOC. In addition to recording the measured value as an input IN, a time stamp, that is to say a numerical value for the time, is also stored in a step TME, wherein this time corresponds to that point in time at which the sensor SEN provided the input IN.

In a next step SEN=VS, it is possible to query whether the sensor SEN is already a verified sensor. In the positive case, the measured value IN, the suitability of which has already been confirmed in previous method passes, can be directly supplied to a database DAT in order to be available for further processing of the measured values. The further method is run through only if the query SEN=VS is negative, that is to say the sensor has not yet been verified.

The further method involves determining the next verified sensor VS for the sensor SEN in a step CLS VS. In this case, the prerequisite is for the verified sensor VS to be in the defined area surrounding the sensor SEN so that a comparability of the measured value of the sensor SEN (IN) with a comparison measured value of the sensor VS is realistic.

If a verified sensor VS has been found, it is used as a reference sensor in order to compare the reference value with the measured value IN. If the measured value IN is within a large tolerance $t_1$ with respect to its reference measured value, it is examined further for the purpose of categorization. The sensor SEN is rejected for recording the measured value in the sensor network and the verification process is stopped (in a step END) only if the measured value IN is outside this tolerance. The measured value which could result in incorrect results during evaluation of the measured values is likewise rejected since it has not been recorded by an authorized sensor.

In the case of further categorization, a further query is started in order to determine whether the measured value IN of the sensor SEN is within a finer tolerance $t_2$. If this is the case, the sensor SEN is categorized as a level 1 sensor and can consequently be used in future as a reference sensor for further passes of the method described above. If the narrower tolerance $t_2$ is left, the sensor SEN is verified as a level 2 sensor. This sensor is not used to verify further sensors SEN, that is to say, in other words, is not intended to be used as a reference sensor. However, the measured values generated are accurate enough to be supplied to data processing of the measured values. In both cases, level 1 sensors LEV1 and level 2 sensors LEV2 are assigned to the sensor network NTW, wherein the range of functions depends on the determined level. The measured value IN which initiated the verification process can be stored in the database DAT before the verification pass reaches its end END.

Figure 4:
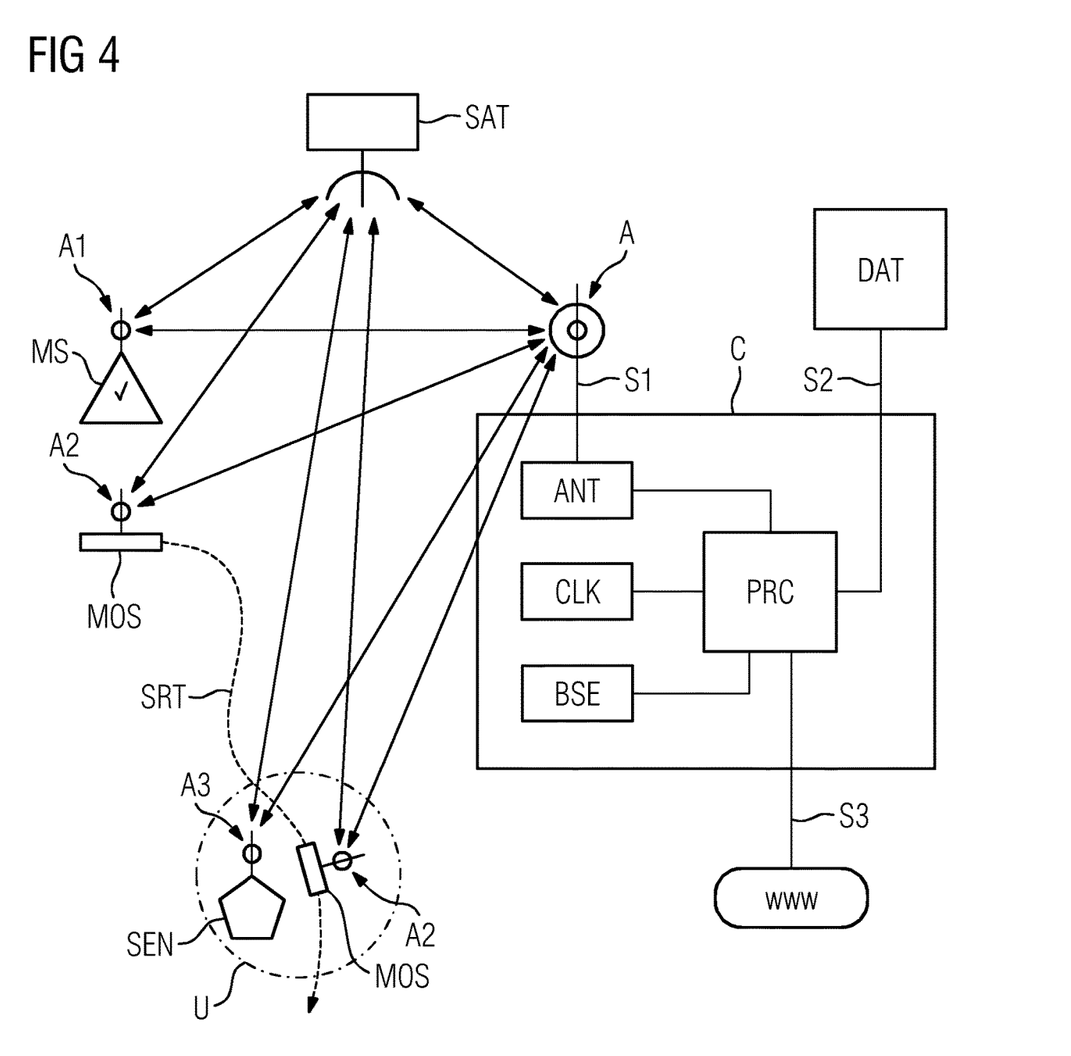
FIG. 4 shows an exemplary embodiment of a sensor network incorporating teachings of the present disclosure with a central computing unit in the form of a block diagram.

FIG. 4 illustrates a computer C which may be used as a central computing unit for the sensor network (represented by the sensors SEN, MOS and MS). The computer has a processor PRC which initially controls at least one antenna module ANT and a clock CLK. These modules are designed as part of the computer. Further elements which are relevant to the method are external according to FIG. 4, in which case they may also be internally implemented as part of the computer. The antenna module ANT is connected to an antenna A via an interface S1. In addition, the processor PRC communicates with an external database DAT via an interface S2. This database can also be provided as an internal memory in the computer C (but not illustrated in FIG. 4). There is also an interface S3 to the Internet www in order to obtain current weather data, for example, which can subsequently provide the swing in the calculation.

In some embodiments, other transmitting and receiving modules can also be used instead of an antenna module in a manner which is not illustrated. For example, it is possible to implement an interface for interchanging information via an infrared interface or a laser interface. The computer C can also make contact with a further antenna A1 of the calibrated sensor MS, an antenna A2 of a mobile sensor MOS or an antenna A3 of a stationary sensor SEN in the sensor network via the antenna A. Said antennas A1, A2, A3 are also designed to establish a connection to a satellite SAT so that the latter can transmit the GPS coordinates, for example, and can therefore make it possible to locate the sensors. The communication of the described individual components is represented by double-headed arrows in FIG. 4. At the same time, the localization of the mobile sensors MOS may change, as illustrated in FIG. 4, if the mobile sensors MOS are on the move on a street SRT of the conurbation, for example.

It can likewise be gathered from FIG. 4 that sensors SEN which are intended to be verified must be in a defined environment U (not illustrated) so that there is a comparison of the data recorded by the sensor SEN and the data recorded by the mobile sensor MOS. This defined area of influence is represented in FIG. 4 as a circle, in the center of which the mobile sensor MOS is located. In some embodiments, however, an area (compare FIGS. 1 and 2) can also be divided into different cells (like in a mobile radio network).

LIST OF REFERENCE SIGNS

CTY City
SRT Street
MOS Mobile sensor
MS Calibrated sensor
SEN Sensor
STR Start
VS Verified sensor
IN Input
ID Identification
DAT Database
LEV1 Level 1 sensor
LEV2 Level 2 sensor
NTW Sensor network
END End
C Computer
PRC Processor
ANT Antenna module
CLK Clock
A Antenna
A1 Antenna
A2 Antenna
A3 Antenna
S1 Interface
S2 Interface
S3 Interface
www Internet
SAT Satellite

What is claimed is:

1. A method for operating a sensor network, the method comprising:
    defining four categories for categorizing sensor accuracy;
    for each of a plurality of sensors in communication with a processor of the sensor network:
        checking whether the sensor is registered in a database of the sensor network, the database storing records for a plurality of registered sensors;
        registering the sensor and storing a corresponding record identifying the sensor in the database responsive to a determination that the sensor is not registered in the database;
        determining a location of the sensor;
        identifying a reference sensor within a spatial environment defined by the location of the sensor;
        comparing a measured value recorded by the sensor to a measured value recorded at the same time by the reference sensor using the processor;
        determining a deviation of the measured value of the sensor from the measured value of the reference sensor to define an accuracy of the sensor using the processor;
        assigning the sensor to precisely one of the four categories depending on the accuracy; and
        storing the assigned category along with an identification of the sensor in the corresponding record;
    wherein each record stored in the database includes an identification of the respective one of the plurality of sensors and precisely one of the four categories corresponding to the respective one of the plurality of sensors;
    wherein the four categories include:
        category 1 indicates the accuracy is sufficient to verify other sensors;

category 2 indicates the accuracy is sufficient to use for data processing;

category 3 indicates the accuracy is insufficient but the respective sensor will be checked again at a later time; and category 4 indicates the accuracy is insufficient and the respective sensor will not be checked again; and gathering data using only sensors from category 1 and category 2.

2. The method as claimed in claim 1, further comprising subjecting sensors assigned category 3 to a new check at intervals of time by comparing measured values recorded using sensors with a measured value which was recorded at the same time and within a defined spatial environment using the reference sensor.

3. The method as claimed in claim 1, wherein each measured value of the sensor and each measured value of the reference sensor is provided with a measurement time.

4. The method as claimed in claim 1, wherein the reference sensor comprises a calibrated sensor.

5. The method as claimed in claim 1, wherein the reference sensor comprises a mobile sensor used to verify sensors which enter the spatial environment of the reference sensor during a movement of the latter.

6. The method as claimed in claim 5, wherein the reference sensor is located in a means of transport.

7. The method as claimed in claim 6, further comprising tracking a route of the reference sensor located in the means of transport.

8. A sensor network comprising:

a multiplicity of sensors; and a data processing system coupled to the multiplicity of sensors, the data processing system including a database storing a record for each sensor in a memory and a processor;

wherein, for each of a plurality of sensors in communication with a processor of the sensor network, the processor is programmed to:

define four categories for categorizing sensor accuracy;

check whether the sensor is registered in the database;

register the sensor and store a corresponding record identifying the sensor in the database responsive to a determination that the sensor is not registered in the database;

determine a location of the sensor;

identify a reference sensor among the multiplicity of sensors, the reference sensor within a spatial environment defined by the location of the sensor;

compare a measured value recorded by the sensor to a measured value recorded at the same time by the reference sensor;

determine a deviation of the measured value of the sensor from the measured value of the reference sensor to define an accuracy of the sensor;

assign the sensor to precisely one of the four categories depending on the accuracy; and store the assigned category along with an identification of the sensor in the corresponding record of the database;

wherein each record stored in the database includes an identification of the respective one of the multiplicity of sensors and precisely one of the four categories corresponding to the respective one of the multiplicity of sensors;

wherein the four categories include:

category 1 indicates the accuracy is sufficient to verify other sensors;

category 2 indicates the accuracy is sufficient to use for data processing;

category 3 indicates the accuracy is insufficient but the sensor will be checked again at a later time; and category 4 indicates the accuracy is insufficient and the sensor will not be checked again; and the data processing system is further programmed to gather data using only sensors identified in category 1 and category 2.

9. The sensor network as claimed in claim 8, wherein said sensor network is installed in an area.

10. The sensor network as claimed in claim 8, wherein the sensors measure an air quality.

* * * * *